Figure 1:
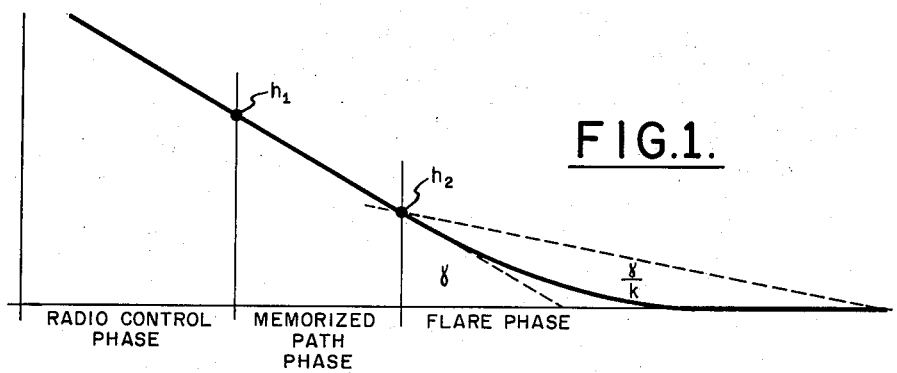

Dec. 24, 1963 M. B. GLASER ETAL 3,115,319
FLARE-OUT SYSTEM
Filed Oct. 12, 1961 3 Sheets-Sheet 1

INVENTORS
MYRON B. GLASER
HARRY MILLER
BY
ATTORNEY

United States Patent Office 3,115,319
Patented Dec. 24, 1963

3,115,319
FLARE-OUT SYSTEM
Myron Barnard Glaser, Phoenix, and Harry Miller, Scottsdale, Ariz., assignors to Sperry Rand Corporation, Great Neck, N.Y., a corporation of Delaware
Filed Oct. 12, 1961, Ser. No. 144,758
4 Claims. (Cl. 244—77)

This invention relates in general to landing control equipment for aircraft and more particularly to apparatus for guiding a landing aircraft through a flare-out maneuver.

In aircraft instrument landing systems, a radio beam usually defines a glide path along which a craft is to proceed to touch down on a runway, this defined path being in essence a straight line intersecting the horizontal runway at an appreciable angle. It has been found that such a straight line glide path brings the craft into contact with the earth with too great a shock. Therefore, it is desirable to "flare-out" the actual glide path of the craft in proximity to the earth, i.e. cause the craft to approach the runway in a somewhat asymptotic manner.

The glide path beam, which is generally wedge-shaped, is very narrow and noisy at low altitudes, thereby causing unstable characteristics in the landing control system and rendering control of the craft along the glide path beam difficult, if not impossible, at such altitudes.

To overcome these inherent limitations of prior art landing control systems, apparatus embodying the present invention stores, or memorizes, a signal representing the radio-defined glide path at an altitude at which radio control is reliable. The radio receiver is then disengaged and the aircraft is made to follow the memorized glide path by equating the signal representing the memorized glide path to a signal representing the actual glide path of the craft, i.e. the actual glide path is made to coincide continually with a memorized reference glide path. This may be done, for example, by applying the error signal resulting from the aforementioned equation to a meter and flying the craft so that the meter indicates that no error signal is being applied thereto. As the craft descends down the glide path toward the runway, an altitude is reached at which a flare-out maneuver is commenced.

To flare out, apparatus embodying the present invention suddenly divides the signal representing the memorized reference glide path by a signal representing a constant (greater than one) to produce a signal representing a new reference glide path, the new reference glide path having a slope that is but a fraction of the slope of the memorized glide path. As a result, a substantial error signal is applied suddenly to the meter. The craft is then flown to cancel this error signal, i.e. the craft is flown to assume the new reference glide path, and in so doing flies a smooth, somewhat asymptotic, flare-out maneuver.

Since the slope of the final reference glide path is always a particular fraction of the slope of the memorized reference path, the magnitude of the error signal which suddenly occurs at the flare-out altitude varies as a function of the steepness of the memorized glide path: for steep approaches, the error signal is substantial; for shallow approaches, the error signal is small. For example, with a divisor constant equal to 4 and a memorized descent rate of 16 ft./sec., the suddenly occurring error signal will be proportional to (16−16/4) or 12 ft./second. If, on the other hand, the memorized descent rate was only 12 ft./sec., the error signal would be proportional to (12−12/4) or 9 ft./sec. Such a feature is desirable because it causes the meter to indicate always the amount that the pilot must pull back on his stick to effect flare-out maneuvers.

As will be described later, apparatus embodying the present invention when employed in landing control equipment readily adapts that equipment to provide continual self-checking of the equipment during landing maneuvers, malfunctions anywhere in the equipment resulting always in ordered pitch-up maneuvers.

A principal object of the invention is to provide apparatus for directing an aircraft along a glide path and through a flare-out maneuver to a landing.

Another object of the invention is to provide aircraft landing control equipment which, to effect a flare-out maneuver, divides a signal representing a first glide path reference by a constant to produce a new reference signal, the new reference signal representing a glide path whose slope is a constant fraction of the slope of the first glide path reference.

Another object of the invention is to provide landing control equipment which continually self-checks its components as the craft proceeds along and completes a landing maneuver.

Figure 3:
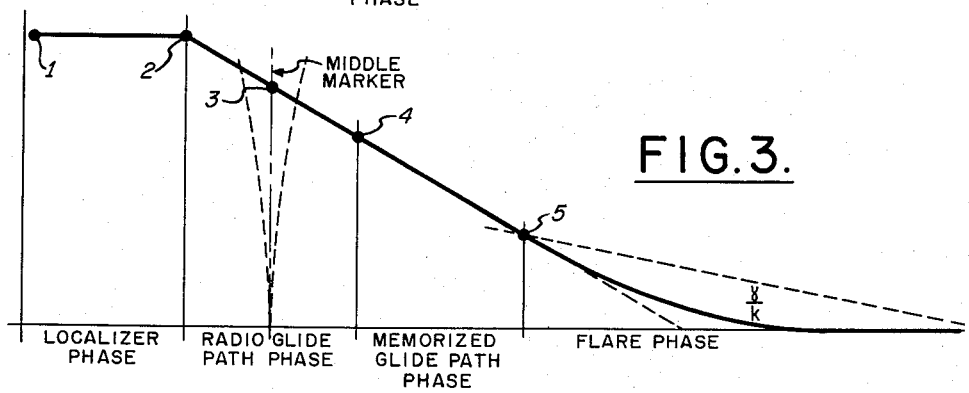
Figure 2:
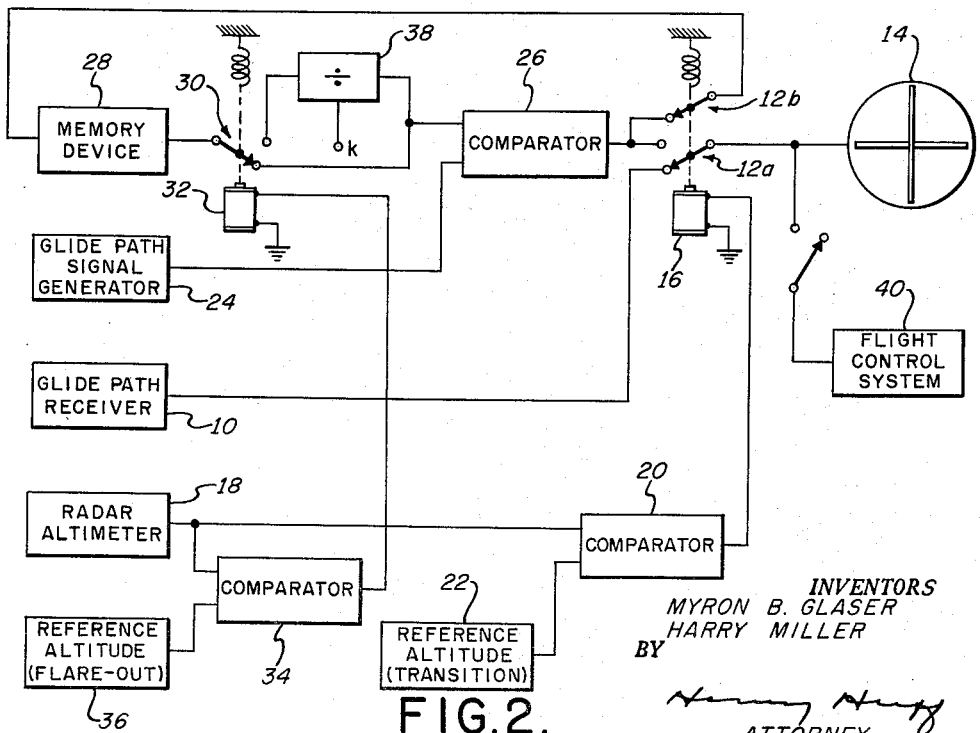
Figure 4A:
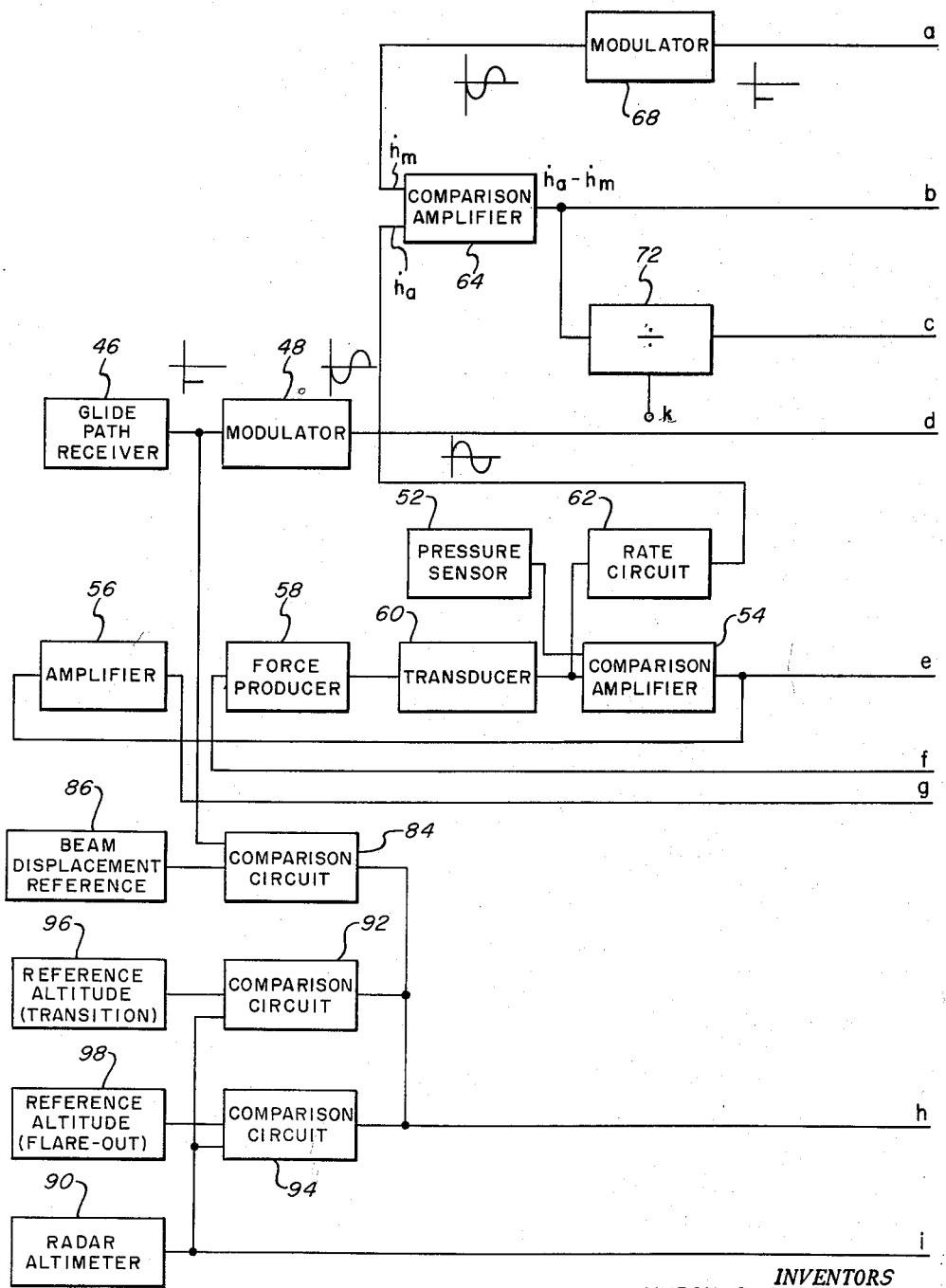
Figure 4B:
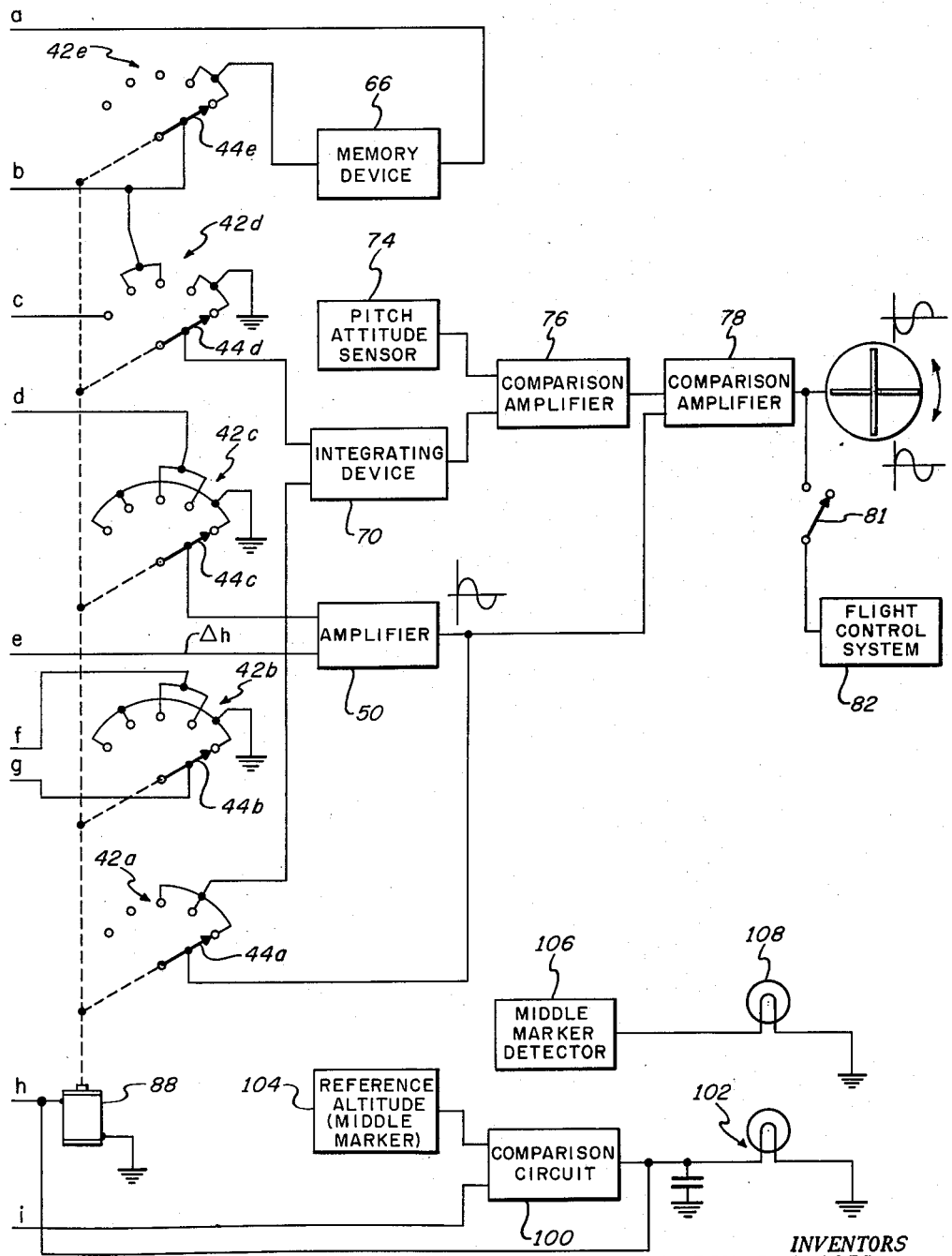

The invention will be described with reference to the figures of which:

FIG. 1 is a diagram of a typical glide path depicting the points at which a radio defined path is memorized and a flare-out maneuver is commenced, FIG. 2 is a block diagram showing the general arrangement of components in an embodiment of the invention, FIG. 3 is a diagram useful in describing the presently preferred form of the invention, and FIGS. 4a and 4b together constitute a block diagram of the presently preferred form of the invention.

Referring to FIGS. 1 and 2, a glide path receiver 10, such as an Instrument Landing System receiver, applies its output signal through a switch 12a to the horizontal bar of a cross pointer indicator 14, the switch 12a being held in the position shown when a relay 16 is energized. A radar altimeter 18 applies a signal representing craft altitude above a runway to a comparator 20; also applied to the comparator 20 is a signal from a reference 22, this signal representing the altitude at which the radio defined glide path is to be memorized, i.e. the altitude designated $h_1$ on FIG. 1. So long as the signal representing the craft altitude is greater than the signal representing the reference altitude $h_1$, the comparator 20 applies an output signal to the relay 16, thereby energizing the relay and applying the receiver 10 output signal to the indicator 14 horizontal bar. One simple form of comparator capable of providing such a function would be a diode to which the radar altimeter signal is applied, the diode then being connected in series with the relay 16 and being backbiased by the signal from the reference 22. This form of comparator is described and shown on page 360, FIG. 15-1, Pulse and Digital Circuits, John Millman and Herbert Taub, McGraw Hill Publishing Company, New York 1956.

A glide path signal generator 24, generating a signal representing the instantaneous glide path of the craft, applies that signal to a comparator 26, e.g. a comparator similar to element 6 of U.S. Patent 2,841,345, issued to Halpert and Jude and assigned to the assignee of this invention. The glide path signal generator 24 may provide either a signal representing the instantaneous flight path angle of the aircraft or a signal representing the instantaneous rate of descent of the aircraft. A signal representing the craft flight path angle may be provided by the apparatus disclosed in US. Patent 2,896,145, issued to R. Snodgrass and assigned to the assignee of the present invention. The signal representing the craft rate of descent may be provided by apparatus such as the combination of elements 1 and 5 of U.S. Patent 2,841,345. The output signal from the comparator 26 is applied through a switch 12b to a memory device 28, the switch 12b being ganged with the switch 12a. The memory device 28, which may be a simple capacitor, applies its output signal through a switch 30 to the comparator 26. The switch 30 is held in the position shown by a normally energized relay 32 that is energized by the output signal from a comparator 34. The comparator 34, which may be similar to the comparator 26, compares the radar altimeter output signal with a signal from a reference 36, the reference 36 output signal representing the altitude at which a flare-out maneuver is to be commenced, i.e. the altitude designated $h_2$ on FIG. 1. When there is no comparator 34 output signal, the relay 32 releases the switch 30 to its upper position, thereby causing the memory device output signal to be applied to a divider 38; the divider 38 also receives a divisor signal $k$. The quotient output signal from the divider is applied to the comparator 26. Preferably the divider is a simple potentiometer which has the memory device output signal applied thereacross and the wiper of the potentiometer positioned in proportion to the divisor $k$. Such a divider is preferred because the ratio of the output signal to the input signal remains unaffected regardless of variations in the characteristics of the potentiometer.

When the switches 12a and 12b release to their upper positions, they apply, respectively, the comparator 26 output signal to the indicator 14 and remove that signal from the memory device 28. A flight control system 40 may be connected by a switch to receive the signal being applied to the indicator 14 and thereby automatically control the craft during the landing maneuver.

With the craft on the radio defined glide path above the altitude $h_1$, the glide path receiver 10 has no output signal and, so long as the craft remains on the defined glide path, the horizontal bar of the indicator 14 remains in its neutral position. During this time, the glide path signal generator 24 applies a signal representing the instantaneous glide path of the craft to the comparator 26, i.e. when the craft is on the radio defined path, the glide path signal generator 24 provides a signal representing that path. Since the comparator 26 has an output signal whenever the memory device 28 applies thereto a signal representing a glide path different from the radio defined glide path, the comparator 26 constantly follows up to cancel its own output signal by causing the memory device 28 to store a signal representing the radio defined glide path.

As the craft descends down the radio defined glide path, the radar altimeter output signal gradually reduces to equal the signal from the reference 22, this occurring when the craft reaches the altitude $h_1$. At this time, the switches 12a and 12b, respectively, move to their upper positions, thereby storing in the memory 28 a signal representing the glide path that the craft had at altitude $h_1$ and applying the output signal from the comparator 26 to the indicator 14. Between altitudes $h_1$ and $h_2$ the craft is flown so that its glide path, as represented by the output signal from the glide path signal generator 24, is the same as the glide path represented by the signal from the memory device 28.

In descending between altitudes $h_1$ and $h_2$, the radar altimeter output signal gradually reduces to equal the signal produced by the reference 36 so that at altitude $h_2$ the comparator 34 has no output signal, thereby deenergizing the relay 32 and releasing the switch 30 to its upper position. At the moment the switch 30 moves to its upper position, the output signal from the memory device 28 is applied to the divider 38. Instantly, the divider 38 provides an output signal representing a new glide path reference, the slope of which is but a fraction of the slope of the memorized glide path: the aforementioned "fraction" is determined by the magnitude of the divisor $k$. Since the divider 38 output signal, i.e. the signal representing the new glide path reference, is compared (in the comparator 26) with the signal representing the actual craft glide path, the comparator 26 suddenly (at altitude $h_2$) has a sizeable output error signal which causes the indicator 14 horizontal bar to deflect, the amount of deflection being proportional to the magnitude of the error signal. As the pilot flies the craft to return the bar to its neutral position and thereby cancel the error signal, the craft effects a flare-out maneuver.

As was stated earlier, steep and shallow radio controlled approaches respectively cause large and small deflections of the indicator bar. This is as it should be since, for any given aircraft, a steep approach requires a greater manipulation of the control stick to effect the flare-out maneuver than a shallow approach. That is, a large deflection of the indicator bar tells the pilot that he was on a steep approach and, to effect a safe flare-out maneuver, he must pull back on his control stick considerably. A small deflection of the indicator bar tells the pilot the converse.

The landing profile of FIG. 3 may be flown with the craft under the control of the landing control system shown in FIG. 4, this landing control system being one in which the equipment self-checks itself as the craft completes the landing maneuver and, in the event of the malfunction anywhere, a safe nose-up attitude is commanded instantly.

A five-wafer stepping switch, e.g. a switch of a type shown and described in "The Design of Switching Circuits," W. Keister, A. Ritchie, and S. Washburn, D. Van Nostrand Company, Inc., Princeton, N.J., Chapter 9, has wafers 42a through 42e and respective wipers 44a through 44e, each wafer being provided with five positions. The respective switch wipers are stepped counterclockwise from position to position as the craft proceeds along the landing profile and reaches the positions designated 1 through 5 on FIG. 3. If desired, an indicator may be provided to indicate the switch wiper positions, i.e. to tell the pilot his position in the landing profile.

A glide path receiver 46, providing a D.C. signal representing the craft displacement from the glide path radio beam, applies its output signal to a modulator 48. The modulator 48, which may be a simple diode that is periodically biased so as to pass and stop the glide path receiver signal from passing therethrough, converts the D.C. receiver output signal to an A.C. signal. The phase of the A.C. signal from the modulator 48 depends upon the polarity of the receiver 46 output signal. The modulator 48 output signal is applied to the second and third contacts of the switch wafer 42c, the first, fourth and fifth contacts of the wafer being grounded. The signal appearing on the wiper 44c is applied to an amplifier 50.

A pressure sensor 52, providing a signal representing barometric altitude, applies that signal to a comparison amplifier 54, the output signal of which is applied to an amplifier 56. The output signal from the amplifier 56 is applied to a force producing device 58 when the wiper 44b is at the second or third contacts of the wafer 42b. The force producing device 58 produces a force which is converted into an equivalent electrical analog by a transducer 60. The transducer output signal is then applied to a comparison amplifier 54 and compared with the output signal from the pressure sensor 52, the comparison amplifier 54 output signal being applied then to the amplifier 50. Therefore, the elements 52, 54, 56, 58 and 60 in combination form a force-balance barometric pressure computer of a type similar to that disclosed in application Serial No. 49,365 which is assigned to the present assignee. The output signal from the transducer 60, in addition to being applied to the comparison amplifier 54, is also applied to a rate circuit 62, this last-named circuit producing a signal $\dot{h}_a$ representing the rate that the barometric altitude changes, i.e. the rate that the force producer 58 must produce a force to cancel the pressure sensor 52 output signal.

The output signal from the rate circuit 62 is applied to a comparison amplifier 64 which applies its output signal to a memory device 66 when the wiper 44e is at the first and second positions of the wafer 42e. The memory device in this form of the invention may be a simple capacitor. The output signal $\dot{h}_m$ from the memory device 66 is applied to a modulator 68 which, like the modulator 48, converts the D.C. signal stored in the memory to an A.C. signal, the phase of which depends on the polarity of the signal stored in the memory.

The wiper 44d, when at the third and fourth positions of the switch wafer 42d, applies the output signal from the comparison amplifier 64 to an integrating device 70. The comparison amplifier 64 output signal is applied also to a divider 72 (like the divider 38 of FIG. 2) which also receives a divisor signal $k$. When the wiper 44d is at the fifth position on the wafer 42d, the output signal from the divider 72 is applied to the integrating device 70.

The integrating device 70 also has applied thereto the output signal from the amplifier 50 when the wiper 44a is at the first, second and third positions on the wiper 42a. A pitch attitude sensor 74, e.g. a vertical gyro, provides a signal representing craft attitude relative to a reference pitch attitude. The output signals from the pitch attitude sensor and the integrating device 70 are applied to a comparison amplifier 76, which in turn applies its output signal to a comparison amplifier 78. The comparison amplifier 78 also receives the output signal from the amplifier 50 and in turn applies its own output signal to a cross pointer indicator 80 and, when a switch 81 is closed, to a flight control system 82.

A comparison circuit 84, of a type similar to the comparison circuit shown and described on page 343 (FIG. 9.20) of Volume 19, The Massachusetts Institute of Technology Radiation Laboratory Series, McGraw Hill Book Company, Inc., New York, is adapted to receive a D.C. signal from a reference 86 which represents a certain displacement from the glide path beam center. In addition, the comparison circuit 84 receives a D.C. signal from the glide path receiver 46 representing the actual displacement of the craft from the center of the glide path beam. At the instant the glide path receiver 46 output signal falls to the level of the signal provided by the reference 86, the comparison circuit 84 has an output pulse which, when applied to the relay 88, steps the wipers 44a through 44e to their next following positions. The radar altimeter 90 similarly applies an altitude signal to comparison circuits 92 and 94 which respectively apply pulses to the relay 88 when the altitude signal equals the signals provided by the altitude references 96 and 98 respectively.

The output signal from the radar altimeter 90 is applied to a comparison circuit 100 which also has applied thereto a signal from a reference 104 representing the altitude at which the craft should be at when the craft intercepts the instrument landing system middle marker beam. The comparison circuit 100, which may be similar to the comparison circuit 84, applies its output pulse to the relay 88 (to step the switches 42a through 42e to their third positions) and to a lamp in a slow-to-extinguish lamp circuit 102. A middle marker detector 106, i.e. a receiver tuned to the middle marker frequency, applies an output signal to a lamp 108 whenever the craft is flying through the middle marker beam pattern.

With the switch 81 closed, the switch wipers 44a through 44e in their respective first positions, and with the craft flying "localizer," i.e. between points 1 and 2 of the landing profile shown in FIG. 3, the craft must hold altitude and the horizontal bar of the indicator 80 must remain in its neutral position if elements 74, 76, 78, 80, 81 and 82 are functioning properly. Should the craft altitude start to change so that an error signal $\Delta h$ is applied to the comparison amplifier 78, the craft must instantly change its pitch attitude so that the pitch attitude sensor 74 provides an output signal which, when passed through the comparison amplifier 76 and applied to the comparison amplifier 78, cancels the amplifier 50 output signal.

As the craft approaches point 2 of the landing profile, i.e. as the craft flies into the glide path beam pattern, the output signal from the glide path receiver 46 gradually reduces to equal the output signal from the beam displacement reference 86, at which time the switch wipers 44a through 44e all step to their respective second positions. If this occurs it can be safely assumed that the glide path receiver 46, the beam displacement reference 86, the comparison circuit 84, and the relay 88 are functioning properly. If they are not functioning properly, the craft will continue at constant altitude right past position 2 of the landing profile. At landing profile position 2, the craft must start to descend. To descend, the modulator 48 must operate properly and the craft pitch attitude must be changed continuously to produce a pitch attitude signal that cancels the modulator output signal, thereby keeping the craft on the radio-defined glide path.

The small signal characters appearing near certain elements of FIG. 4 represent the output signals produced by those elements at the instant the switch wipers 44a through 44e move to their respective second positions.

As the craft descends down the radio-defined glide path, the comparison amplifier 54 is made to have no output signal by putting the force producer 58 in follow-up, i.e. the transducer 60 continually produces a signal that cancels the output signal from the pressure sensor 52. If elements 54, 56, 58 and 60 are not functioning properly, a signal appears at the output of the comparison amplifier 54, this signal being added to the modulator 48 output signal and causing the amplifier 50 output signal to be such that the craft must pitch up to produce a pitch attitude sensor output signal that cancels the amplifier 50 ouput signal.

When the craft descends to position 3, the switch wipers must move to their respective third positions and the lamp 108 and the lamp in the circuit 102 must light simultaneously. If the lamps light simultaneously the radar altimeter 90 and the reference 104 can be assumed to be operating properly; in addition, such simultaneous lighting of the lamps indicates that the craft is being radio controlled properly. Otherwise, the craft would not be at the middle marker reference altitude at the proper point in the landing profile.

Between profile positions 2 and 3, the rate circuit 62 must provide a signal representing the actual rate of descent of the craft and the memory 66 must continuously store such signal. Therefore, when the switch wiper 44d moves to its third position, the comparison amplifier 64 must not have an output signal; otherwise, either the memory 66 or the modulator 68 (or both the memory and modulator) are malfunctioning. If the comparison amplifier 64 does have an output signal at this time, it is the signal $h_a$ which, when applied eventually to the flight control system 82, causes the craft to fly up.

When the craft reaches the landing profile position 4, the switch wipers step to their respective next positions. When this occurs, the force producer 58 ceases to produce a changing force, thereby causing the rate circuit 62 to have no output signal. As a result, the comparison amplifier 64 output signal is the signal $h_m$, this signal being applied to and integrated by the integrating device 70 to produce a displacement signal. The displacement signal so produced is then compared with the displacement signal $\Delta h$ to produce an error signal which keeps the craft at the proper altitude as it descends down the glide path. In the event that the comparison amplifier 64 is malfunctioning, no output signal is produced thereby and the signal $\Delta h$ alone is applied to the flight control system 82, this signal being such as to cause the craft to fly up.

If a malfunction occurs anywhere in the equipment when the craft is at profile position 5, the craft will be at a sufficiently safe attitude for the pilot to effect easily a flare maneuver manually.

While the invention has been described in its preferred embodiments, it is to be understood that the words which have been used are words of description rather than of limitation and that changes within the purview

What is claimed is:

1. Apparatus for use with a flight control system for controlling the flight of a craft so that the craft flies a particular landing profile comprising means for producing a signal representing craft displacement from a radio defined glide path, means for producing a signal representing craft descent rate while flying said profile, means for continually memorizing the craft descent rate signal, means for comparing the memorized descent rate signal with the signal representing the actual craft descent rate to produce a descent rate error signal, means for integrating said descent rate error signal, means for producing a signal representing the craft change in altitude from a particular point, means for comparing said integrated descent rate error signal with said change in altitude signal to produce a displacement error signal, means for applying said beam displacement signal to said flight control system above said particular profile point and said displacement error signal thereto below that point, means for reducing at a second lower point on said profile said stored altitude rate signal to a proportion thereof and thereby produce an error signal at the output of said comparison means, whereby said craft may fly a flare out maneuver by cancelling that error signal, and means for measuring craft altitude, means for indicating when said craft intercepts a marker beacon beam, and means for indicating when said altitude measuring means measures the altitude said craft should be at while intercepting the beacon beam.

2. Aircraft landing control apparatus comprising means for producing a plurality of signals useful in controlling the vertical flight of said craft, divider means for receiving one of said plurality of signals and producing a signal representing the quotient of its received signal divided by a predetermined constant, means for algebraically adding signals applied thereto to produce a craft control signal, means for continually applying to said means for algebraically adding signals all of said plurality of signals except said signal received by said divider means, and switch means adapted to apply to said means for algebraically adding signals either the signal received by said divider means or the quotient output signal from said divider means depending on whether said craft respectively is above or below a particular flare altitude.

3. Aircraft landing control apparatus comprising means for producing a signal representing a reference rate of descent for said craft, means for producing a signal representing the actual craft rate of descent, means for comparing said rate of descent signals to produce a signal representing the error therebetween, divider means for receiving said error signal to produce an output signal representing the quotient of the signal received by said divider means divided by a predetermined constant, and switch means adapted to select either the signal applied to or the output signal from said divider means depending on whether said craft is respectively above or below a certain altitude, whereby the signal at the output of said switch means may be used to control the vertical flight of said craft.

4. Apparatus for use by a flight control system for controlling the flight of a craft so that it flies a particular landing profile comprising means for producing a signal representative of craft displacement from a radio defined glide path, means for producing a signal representative of craft descent rate while flying said profile, means for continually memorizing the craft descent rate representative signal, means for comparing the memorized signal with the signal representative of the actual craft descent rate to produce a descent rate error signal, means for integrating said descent rate error signal, means for producing a signal representative of the craft change in altitude from a particular point, means for comparing said integrated descent rate error signal with said change in altitude representative signal to produce a displacement error signal, means for applying said beam displacement representative signal to said flight control system above said particular profile point and said displacement error signal thereto below that point, means for attenuating at and below a second lower point on said profile the descent rate error signal to a predetermined proportion thereof thereby producing an appreciable error signal at the output of said means producing a displacement error signal, whereby said craft may fly a flare-out maneuver by cancelling that error signal, means for measuring craft altitude, means for indicating when said craft intercepts a marker beacon beam, and means for indicating when said altitude measuring means measures the altitude said craft should be at while intercepting the beacon beam.

References Cited in the file of this patent
UNITED STATES PATENTS

| 2,987,275 | Moncrieff-Yeates | June 6, 1961 |
| 3,015,459 | McLane | Jan. 2, 1962 |
| 3,081,969 | Farris | Mar. 19, 1963 |